United States Patent [19]
Valentine

[11] 4,454,454
[45] Jun. 12, 1984

[54] MOSFET "H" SWITCH CIRCUIT FOR A DC MOTOR

[75] Inventor: Richard J. Valentine, Mesa, Ariz.

[73] Assignee: Motorola, Inc., Schaumburg, Ill.

[21] Appl. No.: 494,201

[22] Filed: May 13, 1983

[51] Int. Cl.³ .............................................. H02P 7/28
[52] U.S. Cl. ..................................... 318/293; 318/257; 318/339; 307/270; 307/584
[58] Field of Search ............... 318/257, 287, 291, 293, 318/681, 317; 307/270, 583, 584, 585

[56] References Cited
U.S. PATENT DOCUMENTS

| | | | |
|---|---|---|---|
| 3,229,181 | 1/1966 | Evans | 318/293 |
| 3,588,540 | 6/1971 | Bohn | 307/584 X |
| 3,602,738 | 8/1971 | Bohm | 307/584 X |
| 3,924,168 | 12/1975 | Woodward | 318/257 |
| 3,935,481 | 1/1976 | Uchikawa | 307/584 |

FOREIGN PATENT DOCUMENTS 134547 10/1979 Japan ................................. 307/270

OTHER PUBLICATIONS

Bryson, IBM Tech. Disclosure Bulletin, 3(8), 19, 1961.
Julliere et al., Int. J. Electronics, 46(5), 507–512, 1979.

Primary Examiner—G. Z. Rubinson
Assistant Examiner—Bentsu Ro
Attorney, Agent, or Firm—William J. Kubida

[57] ABSTRACT

A MOSFET "H" switch circuit for providing bidirectional control to a DC motor. The power MOSFET's employed have significant advantages over bipolar and darlington power transistors and allow for microcomputer interfacing for providing bidirectional rotational control as well as motor speed control by pulse width modulation.

20 Claims, 3 Drawing Figures

MOSFET "H" SWITCH CIRCUIT FOR A DC MOTOR

BACKGROUND OF THE INVENTION

The present invention relates, in general, to the field of DC motor control circuits. More particularly, the present invention relates to an "H" switch circuit utilizing power MOSFETs for providing bidirectional control of fractional horsepower DC motors.

The DC low voltage fractional horsepower motor is a standard for applications that require bidirectional shaft control such as, cassette tape drives, automobile power windows, seats, door locks or windshield wipers, robotic mechanical controls, small industrial machines, etc. Heretofore, mechanical reversing gears and linkages have been used for providing such bidirectional control, particularly in automobile applications.

Previously, there has been described an "H" switch circuit for use in reversing the motor supply voltage for bidirectional control of a DC motor. Opposing top and bottom switches coupling the DC motor input leads to a voltage source and circuit ground control the motor direction by switching the voltage polarity, which in turn, switches the motor's shaft rotation either clockwise or counterclockwise. Heretofore, conventional bipolar devices have been used in such circuits. However, the bipolar design is not very practical because of the large base drive requirement of the transistors. The substitution of Darlington transistors in the "H" switch concept is also not practical for low voltage high current applications due to the large forward voltage drop across the devices which in turn reduces the voltage to the motor resulting in a slower operating motor. This is especially undesirable when dealing with a generally fixed voltage source such as an automobile battery and when optimum motor speed is essential. Further, although the bipolar devices would allow for direct pulse width modulation in switching, such that motor speed could be controlled, such devices are not readily interfaced with microprocessors for controlling motor speed. The Darlington devices, moreover, although capable of being directly driven, are undesirable due to their large forward voltage drop.

SUMMARY OF THE INVENTION

It is therefore an object of the present invention to provide an improved MOSFET "H" switch circuit for a DC motor.

It is further an object of the present invention to provide an improved MOSFET "H" switch circuit for a DC motor which allows for highly efficient implementation of bidirectional motor control.

It is still further an object of the present invention to provide an improved MOSFET "H" switch circuit for a DC motor which may be inexpensively fabricated using existing devices.

It is still further an object of the present invention to provide an improved MOSFET "H" switch circuit for a DC motor which allows for direct pulse width modulation of motor speed while allowing for readily implemented interfacing with microprocessors for bidirectional motor speed control.

The foregoing and other objects are achieved in the present invention wherein there is provided an "H" switch circuit for providing bidirectional control to a DC motor which comprises first, second, third and fourth MOSFETs having respective drain, gate and source electrodes thereof. The first and second drain electrodes are connected to a drain voltage line, the first and second source electrodes being respectively connected to the third and fourth drain electrodes for connection to first and second input lines of the motor respectively. The third and fourth source electrodes are coupled to a common voltage line, the first and fourth gate electrodes being coupled to a first control line and the second and third gate electrodes being coupled to a second control line. Means are provided for alternately activating the first and second control lines whereby the drain voltage line and the common voltage line are alternately coupleable to the first and second input lines of the motor.

BRIEF DESCRIPTION OF THE DRAWINGS

The above mentioned and other features and objects of the invention and the manner of attaining them will become more apparent and the invention itself will be best understood by reference to the following description of an embodiment of the invention taken in conjunction with the accompanying drawings, wherein.

DESCRIPTION OF A PREFERRED EMBODIMENT

Figure 1:
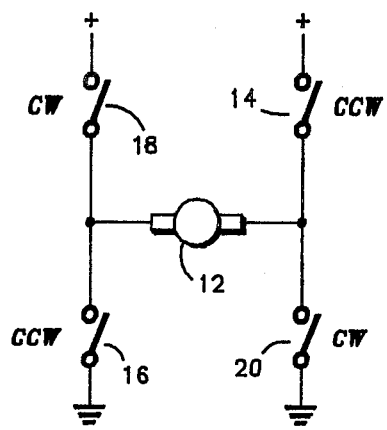
FIG. 1 illustrates a simplified conceptual representation of an "H" switch circuit for providing bidirectional control to a DC motor.

With reference to FIG. 1, a conceptual representation of an "H" switch circuit 10 is shown. "H" switch circuit 10 is useful for providing bidirectional control to DC motor 12. When switched in consonance, CW switches 18 and 20 provide voltage of a given polarity to DC motor 12 by coupling the leads thereof to a source of positive DC voltage and circuit ground. Likewise, CCW switches 14 and 16, when switched in consonance, can change the directional rotation of DC motor 12 by reversing the polarity applied to the input leads of DC motor 12.

Figure 2:
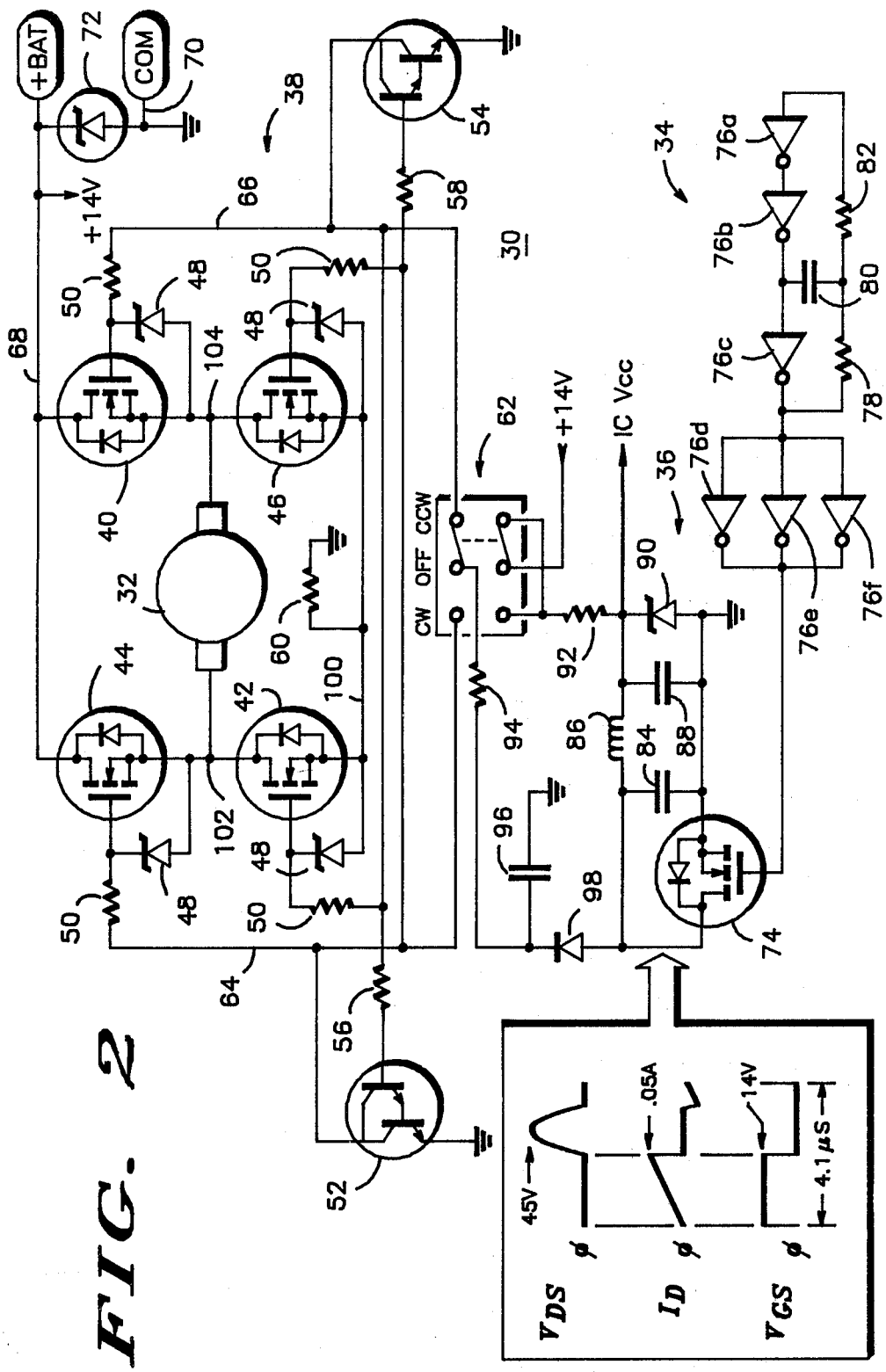
FIG. 2 illustrates a power MOSFET "H" switch circuit in accordance with the present invention.

Referring now to FIG. 2, a power MOSFET "H" switch circuit 30 is shown. As shown, power MOSFET "H" switch circuit 30 comprises, in pertinent part, an "H" switch circuit 38 and a DC inverter 36 driven by oscillator 34 for providing gate drive to the circuit as shown. Power MOSFET "H" switch circuit 30 provides bidirectional control to DC motor 32.

"H" switch circuit 38 comprises, in major part, CCW power MOSFETs 40 and 42 and CW power MOSFETs 44 and 46. In the embodiment shown, CCW power MOSFETs 40 and 42 and CW power MOSFETs 44 and 46 comprise Motorola MTP25N05 N-channel enhancement mode power MOSFETs. These devices incorporate an internal clamp diode which conducts when the device source is positive with respect to the drain, and will carry a forward current equal to the drain current rating of the device. In the reverse direction, the blocking voltage of the clamp diode is equal to the drain source breakdown. Similar power MOS field effect transistors or TMOS TM devices available from Motorola Inc. may be substituted therefor.

CCW power MOSFET 40 and CW power MOSFET 44 have their respective drain terminal connected to a source of positive DC voltage such as a battery connected to battery line 68. A transient protector 72 couples battery line 68 to common line 70. Transient protector 72 may be furnished as a Motorola MR2520L 28-volt suppressor. The source terminal of CW power MOSFET 44 is connected to first input lead 102 of DC motor 32 as well as the drain terminal of CCW power MOSFET 42. In like manner, the source terminal of CCW power MOSFET 40 is connected to second input 104 of DC motor 32 as well as the drain terminal of CW power MOSFET 46. The source terminal of CCW power MOSFET 42 and CW power MOSFET 46 are connected to current sense line 100 which is coupled to circuit ground through resistor 60. The gate and source terminals of CCW power MOSFETs 40 and 42 and CW power MOSFETs 44 and 46 are coupled through respective zener diodes 48 as shown. Resistors 50 couple the gate terminal of CCW power MOSFETs 40 and 42 to CCW control line 66 as well as the gate terminals of CW power MOSFETs 44 and 46 to CW control line 64. CCW counter EMF sensor 52 has its collector terminal connected to CW control line 64 and its base coupled to CCW control line 66 through resistor 56. The emitter terminal of CCW counter EMF sensor 52 is connected to circuit ground. Similarly, CW counter EMF sensor 54 has its collector terminal connected to CCW control line 66 and its base terminal coupled to CW control line 64 through resistor 58. The emitter terminal of CW counter EMF sensor 54 is connected to circuit ground. CCW counter EMF sensor 52 and CW counter EMF sensor 54 may be furnished as 2N6427 small signal Darlington transistors.

CW control line 64 and CCW control line 66 are alternately activated by means of DPDT switch 62 having a center off position. By means of DPDT switch 62, in conjunction with "H" switch circuit 38, the rotational direction of DC motor 32 may be controlled. DPDT switch 62 is connected to battery line 68 and DC inverter 36 as will be more fully described hereinbelow.

Oscillator 34 comprises in pertinent part a number of interconnected inverters 76a–76f. Inverters 76a–76f may be furnished as a Motorola MC14069B hex inverter. As shown, inverters 76a, 76b and 76c are connected in series, the combination being connected in parallel with series connected resistors 78 and 82. A capacitor 80 connects the output of inverter 76b to the point of connection between resistor 78 and resistor 82. The output of inverter 76c is applied to the input of parallel connected inverters 76d, 76e and 76f having their common output connected to the gate of small signal power MOSFET 74 of DC inverter 36. Connected as shown and with resistors 78 and 82 having values of 10K and 100K ohms respectively and capacitor 80 a value of 91 pf, oscillator 34 will have an oscillation frequency of approximately 240 kHz.

Small signal power MOSFET 74 has its source terminal connected to circuit ground and its drain terminal connected to the anode of diode 98 as well as one terminal of coil 86. Capacitor 84 is connected in parallel with the drain and source terminals of small signal power MOSFET 74. The cathode of diode 98 is coupled to the center off terminal of DPDT switch 62 through resistor 94 as well as to circuit ground through capacitor 96. Coil 86, which may have an impedance of 200 μh, has its opposite lead connected to DPDT switch 62 through resistor 92 as shown. A source of positive 14 volts is applied to resistor 92 from battery line 68. Parallel connected capacitor 88 and zener diode 90 couple resistor 92 to circuit ground as shown and provide a source of $V_{CC}$ for inverters 76a–76f.

The output of DC inverter 36 is shown in the inset waveforms as $V_{DS}$ and $I_D$ in terms of $V_{GS}$. As shown, the output of oscillator 34 supplies a square wave pulse of between 0 and 14 volts having a duty cycle of approximately 50% at a time period of 4.1 microseconds. This causes the drain current $I_D$ of small signal power MOSFET 74 to ramp to a level of 0.05 amps. As $I_D$ reaches 0.05 amps, $V_{DS}$ goes from 0 to 45 volts and back to 0 sinusoidally in a time period of 1.5 microseconds. It should be noted that the output of DC inverter 36, functioning as a flyback inverter, will track the power supply unit voltage on battery line 68 ensuring an adequate gate bias level is maintained even if the voltage available on battery line 68 drops as low as 6 volts. DC invertor 36 and oscillator 34 dissipate approximately 140 milliwatts. Transient protector 72 protects power MOSFET "H" switch circuit 30 from 28 volt or higher voltage spikes appearing on battery line 68. Zener diode 90 limits the supply voltage to DC inverter 36 should the supply voltage on battery line 68 exceed 16 volts.

The counter EMF, or back voltage, of DC motor 32 is sensed using CCW counter EMF sensor 52 and CW counter EMF sensor 54. These devices will shunt, or apply to circuit ground, the drive reversal signals appearing on CW control line 64 and CCW control line 66 respectively until DC motor 32 has stopped acting as a generator. For example, should DC motor 32 remain operating in a counterclockwise direction after DPDT switch 62 is switched off, a positive voltage may be generated on second input lead 104. This voltage will forward bias the one of zener diodes 48 connecting the source terminal of CCW power MOSFET 40 to its gate terminal. This voltage is then coupled through the respective one of resistors 50 to CCW control line 66 which is coupled to the base of CCW counter EMF sensor 52 through resistor 56. If the voltage appearing on CCW control line 66 is above the $V_{BE}$ threshold of CCW counter EMF sensor 52 (approximately 1.4 volts), CCW counter EMF sensor 52 will turn on, thus presenting a low impedance on CW control line 64 effectively connecting it to circuit ground and thereby preventing immediate reversal of DC motor 32 by the switching of DPDT switch 62 to the CW position. It should be noticed, that for use with a DC motor 32 which does not generate a significant amount of counter EMF or one in which mechanical gearing prevents continued rotation when DPDT switch 62 is in the off position, CCW counter EMF sensor 52 and CW counter EMF sensor 54 may be omitted and resistors 56 and 58 directly connected to circuit ground. In this instance, it may be necessary to use larger power MOSFETs for CCW power MOSFETs 40 and 42 and CW power MOSFETs 44 and 46. It should also be noticed that the internal clamp diode within CCW power MOSFETs 40 and 42 and CW power MOSFETs 44 and 46 allow the back EMF of DC motor 32 to be clamped to battery line 68.

It should further be noted that the Motorola TMOS ™ MTP25N05 devices utilized require heat sinking to keep the power MOSFETs junction temperature under 150 degrees Centigrade during worst-case system conditions which might be experienced such as through use of a 16 volt power supply with 100 degree Centigrade ambient temperatures and a stalled DC motor 32. An additional current sensing circuit, hereinafter described, may be added to power MOSFET "H" switch circuit 30 to detect a stall condition of DC motor 32 to gate off the power MOSFETs protecting DC motor 32 against thermal overload. In this regard, current may be sensed at current sense line 100. Depending on the model of DC motor 32 chosen, either larger or smaller power MOSFETs can be used in conjunction with power MOSFET "H" switch circuit 30 without requiring any circuit design changes. This is because the power MOSFETs are voltage driven rather than current driven. It should also be noted, that should a charge pump be integrated within CCW power MOSFETs 40 and 42 and CW power MOSFETs 44 and 46 for providing an internal gate drive, DC inverter 36 may be eliminated.

Figure 3:
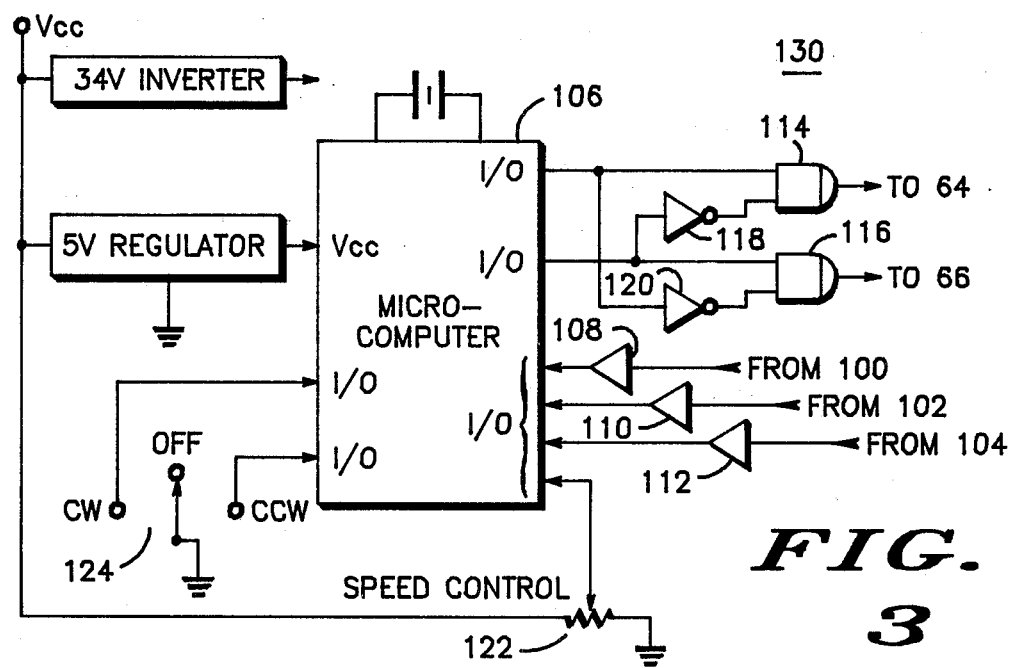
FIG. 3 is a simplified logic flow diagram of a microcomputer based motor control circuit for use in conjunction with the power MOSFET "H" switch circuit of FIG. 2.

Referring additionally now to FIG. 3, a microcomputer based motor control circuit 130 is shown. Due to the adaptability of power MOSFET "H" switch circuit 30 to pulse width modulation, the present invention may be readily utilized in conjunction with a microcomputer based motor control circuit 130 providing speed as well as bidirectional control to DC motor 32. Microcomputer based motor control circuit 130 includes a microcomputer 106 which may be furnished as a Motorola MC6805P2 or similar device. Directional control to DC motor 32 may be provided by means of an SPDT switch 124 connected to I/O terminals of microcomputer 106. Speed control, by means of pulse width modulation may be effectuated by means of a potentiometer 122 providing a variable voltage to another I/O terminal of microcomputer 106 as shown. Information as to current level and DC motor 32 rotational direction may be input to microcomputer 106 through amplifiers 108, 110 and 112 connected respectively to current sense line 100 and first and second input leads 102 and 104. Control output from microcomputer 106 may be also taken from the device I/O terminals by means of AND gate drivers 114 and 116. Inverters 118 and 120 prevent the simultaneous occurrence of activation signals appearing to CW control line 64 and CCW control line 66.

Power MOSFETs use only a fraction of the drive power of an equivalent bipolar power transistor, also maintaining a low forward voltage drop similar to a bipolar device. For use with motor controls, power MOSFETs offer increased power efficiency over bipolar devices and better reliability than electromechanical designs. Power MOSFETs also offer circuit design advantages in that the MOSFET device can be changed for a particular load requirement without readjusting the drive circuitry. This means, that a five amp rated power MOSFET can be upgraded to a 25 amp version by merely changing devices. Further, the power MOSFET exhibits a positive ON voltage temperature coefficient, which will tend to track the resistance of the motor. For example, at a very cold ambient temperature, the motor will exhibit the least internal DC resistance, and the power MOSFET will also exhibit a lower ON resistance, thereby conducting the increased motor current. At relatively high ambient temperatures, the opposite effect takes place. The motor's internal DC resistance increases and the power MOSFET's ON resistance also increases thereby reducing the current, minimizing the possibility of a regenerative thermal overload to occur between the motor and the power MOSFET.

What has been provided therefore is an improved MOSFET "H" switch circuit for a DC motor which allows for highly efficient implementation of bidirectional motor control and which may be inexpensively fabricated using existing devices. Further, the MOSFET "H" switch circuit for a DC motor in accordance with the present invention allows for direct pulse width modulation of motor speed while allowing for readily implemented interfacing with microprocessors for bidirectional motor speed control.

While there have been described above the principles of this invention in conjunction with specific apparatus, it is to be clearly understood that this description is made only by way of example and not as a limitation to the scope of the invention.

I claim:

1. An "H" switch circuit for providing bidirectional control to a DC motor comprising:
    a first MOSFET having first drain, source and gate electrodes thereof, said first drain electrode for coupling a drain voltage line to a first input line of said motor, wherein said motor is connected to said first source electrode;
    a second MOSFET having second drain, source and gate electrodes thereof, said second drain electrode for coupling said drain voltage line to a second input line of said motor, wherein said motor is connected to said second source electrode;
    a third MOSFET having third drain, source and gate electrodes thereof, said third source electrode for coupling a common voltage line to said first input line of said motor, wherein said motor is connected to said third drain electrode;
    a fourth MOSFET having fourth drain, source and gate electrodes thereof, said fourth source electrode for coupling said common voltage line to said second input line of said motor, wherein said motor is connected to said fourth drain electrode;
    first means for activating said first and fourth MOSFET's connected to said first and fourth gate electrodes thereof; and
    second means for activating said second and third MOSFET's connected to said second and third gate electrodes thereof
    whereby said motor may be made operative in a first rotational direction in response to said first activating means and in a second opposite rotational direction in response to said second activating means.

2. The "H" switch circuit of claim 1 wherein said first, second, third and fourth MOSFET's are N-channel power devices.

3. The "H" switch circuit of claim 1 further comprising means for sensing a counter EMF generated by said motor.

4. The "H" switch circuit of claim 1 wherein said first and second activating means comprise a mechanical switch.

5. The "H" switch circuit of claim 1 wherein said first and second activating means comprise a microcomputer based motor control circuit.

6. An "H" switch circuit for providing bidirectional control to a DC motor comprising:
    first, second, third and fourth MOSFET's having respective drain, gate and source electrodes thereof, said first and second drain electrodes being connected to a drain voltage line, said first and second source electrodes being respectively connected to said third and fourth drain electrodes for connection to first and second input lines of said motor respectively, said third and fourth source electrodes being coupled to a common voltage line, said first and fourth gate electrodes being coupled to a first control line and said second and third gate electrodes being coupled to a second control line;

means for alternately activating said first and second control lines whereby said drain voltage line and said common voltage line are alternately coupleable to said first and second input lines of said motor.

7. The "H" switch circuit of claim 6 wherein said first, second, third and fourth MOSFET's and N-channel power devices.

8. The "H" switch circuit of claim 6 further comprising means for sensing a counter EMF generated by said motor.

9. The "H" switch circuit of claim 6 wherein said activating means comprises a mechanical switch.

10. The "H" switch of claim 6 wherein said activating means comprises a microcomputer based motor control circuit.

11. An "H" switch circuit for providing bidirectional control to a DC motor having first and second input leads thereto comprising:

a first MOSFET coupling said first input lead to a drain voltage line;

a second MOSFET coupling said second input lead to a common voltage line, said first and second MOSFET's having common connected gate terminals thereof;

a third MOSFET coupling said second input lead to said drain voltage line;

a fourth MOSFET coupling said first input lead to said common voltage line, said third and fourth MOSFET's having common connected gate terminals thereof; and means for activating first and second control lines connected to said common connected first and second gate terminals and said common connected third and fourth gate terminals respectively.

12. The "H" switch circuit of claim 11 wherein said first, second, third and fourth MOSFET's are N-channel power devices.

13. The "H" switch circuit of claim 11 further comprising means for sensing a counter EMF generated by said motor.

14. The "H" switch circuit of claim 11 wherein said activating means comprises a mechanical switch.

15. The "H" switch circuit of claim 11 wherein said activating means comprises a microcomputer based motor control circuit.

16. An "H" switch circuit for providing bidirectional control to a DC motor comprising:

first and second series connected MOSFET's connected between a drain voltage line and a common voltage line;

third and fourth series connected MOSFET's connected in parallel with said first and second series connected MOSFET's, said first and fourth and said second and third MOSFET's having common connected gate terminals thereof, said motor being connected in series with said first and fourth MOSFET's; and means for activating first and second control lines connected respectively to said common connected gate terminals of said first and fourth and said second and third MOSFET's.

17. The "H" switch circuit of claim 16 wherein said first, second, third and fourth MOSFET's are N-channel power devices.

18. The "H" switch circuit of claim 16 further comprising means for sensing a counter EMF generated by said motor.

19. The "H" switch circuit of claim 16 wherein said activating means comprises a mechanical switch.

20. The "H" switch circuit of claim 16 wherein said activating means comprises a microcomputer based motor control circuit.

* * * * *